United States Patent [19]

Kerk et al.

[11] 4,371,575
[45] Feb. 1, 1983

[54] RIGID, ONE-PIECE, BIAXIALLY STRETCHED SHAPED BODY OF SYNTHETIC RESIN AND METHOD FOR MAKING THE SAME

[75] Inventors: Klaus Kerk, Griesheim; Dieter Mueller, Pfungstadt; Bernd Oleiko, Duisberg-Baerl, all of Fed. Rep. of Germany

[73] Assignee: Röhm GmbH, Darmstadt, Fed. Rep. of Germany

[21] Appl. No.: 264,300

[22] PCT Filed: Nov. 4, 1980

[86] PCT No.: PCT/EP80/00125
§ 371 Date: May 18, 1981
§ 102(e) Date: May 18, 1981

[87] PCT Pub. No.: WO81/01304
PCT Pub. Date: May 14, 1981

[30] Foreign Application Priority Data

Nov. 5, 1979 [DE] Fed. Rep. of Germany ... 7931201[U]

[51] Int. Cl.³ .................. B29C 17/04; B29C 25/00
[52] U.S. Cl. .................................. 428/81; 264/230; 264/342 RE; 264/544; 428/174; 428/220; 428/910
[58] Field of Search .............. 428/192.81, 910, 174, 428/220; 264/230, 342 RE, 544

[56] References Cited

U.S. PATENT DOCUMENTS

| | | |
|---|---|---|
| 3,000,057 | 9/1961 | Swedlow et al. ............... 18/48 |
| 3,727,356 | 4/1973 | Appenzeller ................... 52/81 |
| 3,894,137 | 7/1975 | Moench ......................... 264/230 |
| 4,160,799 | 7/1979 | Locey et al. ................ 264/342 RE |

FOREIGN PATENT DOCUMENTS

| | | |
|---|---|---|
| 1559427 | 7/1970 | Fed. Rep. of Germany . |
| 2107728 | 2/1971 | Fed. Rep. of Germany . |
| 2430182 | 1/1976 | Fed. Rep. of Germany . |
| 2184486 | 12/1973 | France . |
| 7214430 | 6/1972 | Netherlands . |
| 1388600 | 3/1975 | United Kingdom . |

*Primary Examiner*—Paul J. Thibodeau
*Attorney, Agent, or Firm*—Curtis, Morris & Safford

[57] ABSTRACT

What is disclosed is a rigid, one-piece, shaped body, made of a biaxially stretched synthetic resin in the form of a sheet at least 1 mm thick, the edge of which does not lie in a single plane, and the surface of which is smaller than a flat initial surface enclosed by the edge and preferably approximates the mathematically minimum surface enclosed by the edge, is suitable according to the invention as a lightweight building element having high resistance to buckling. The new shaped bodies are made by shaping a flat sheet of biaxially stretched synthetic resin at least 1 mm thick, while in the thermoelastic state, so that the edge of the sheet is brought into a configuration which does not lie in one plane, and the surface enclosed by the edge is allowed to shrink back partially while in the thermoelastic state, whereby a shrinkage of the edge of the sheet is prevented by clamping the edge, and the resulting shaped body is cooled below the softening temperature before the edge clamping is loosened.

8 Claims, 15 Drawing Figures

RIGID, ONE-PIECE, BIAXIALLY STRETCHED SHAPED BODY OF SYNTHETIC RESIN AND METHOD FOR MAKING THE SAME

FIELD OF THE INVENTION

The invention relates to rigid shaped bodies, suitable as light structural elements and preferably translucent. Shaped parts of this type are, for example, transparent domes or barrel vaults made of acrylic glass sheets. They are primarily used as roof elements. The aforementioned shaped bodies do not represent the best technical solution for all loads encountered in practice. Thus, in an uneven stressing of a transparent dome from above, all the forces involved are converted into pressure or buckling strains. The resistance to buckling may then be exceeded locally and the dome caved-in. This process may result in a break in the dome. Simple barrel vaults are even more sensitive in this respect.

DESCRIPTION OF THE PRIOR ART

Transparent domes are extremely rigid structures, which is desirable in many cases but is often also disadvantageous. For covering cable networks, grid shell constructions, and similar substructures which are not completely rigid, form-retaining essentially rigid shaped bodies are desired in the construction of larger closed coverings; the shaped bodies should, however, be capable of limited movement without break if the substructure is elastically deformed. Barrel vaults in accordance with DE-OS No. 21 07 728 are essentially more flexible but cannot often be used because of the scanty resistance to buckling mentioned above.

A disadvantage common to transparent domes and barrel vaults is that, in an array of these structural elements to form longer strips or larger areas, the synthetic resin surfaces always are the parts of the roofing that project highest. With roofings of this type, then, no scaffolding, cables, or the like can be laid on them during repair or maintenance work without endangering the plastic material.

A rigid, one-piece shaped synthetic resin body which can be used as a roof covering element, the edge of which body does not lie in one plane, is known from DE-AS No. 24 30 182. Because it includes a frame which is of one piece therewith, the known body is completely torsion-resistant and is not capable of elastic deformation. Its surface is significantly larger than the imagined planar surface enclosed by the edge. The shaped body has the same disadvantages, described above, as other known roofing elements, for example, transparent domes.

SUMMARY OF THE INVENTION

The object of the present invention is to avoid these disadvantages with the type of shaped body specified in claim 1. It has been found that this object was achieved by shaped bodies of a kind that have a surface smaller than the imaginary smooth initial surface enclosed by the edge of the shaped body.

The imaginary flat initial surface is a surface which is generated from a planar surface by warping or bending around one or more fold lines. The edge of the shaped body of the invention always lies in such a flat initial surface. The surface is geometrically indicated as flat because its generatrix is a straight line. Examples of this type of flat initial surface are cylindrical and conical or saddle-roof surfaces. The edge of the shaped body to be sure lies in a flat initial surface of this type, but not in a plane in the narrow sense, that is, not in a plane in which any number of straight lines can be run through every point thereof.

The flat initial surface enclosed by the edge of the shaped body is not simultaneously the surface of the shaped body of the invention. The surface of the latter differs from the flat initial surface and is smaller. Exceptions aside, the surface of the shaped body of the invention does not belong geometrically to the class of flat surfaces, since its generatrices are not straight lines. The surface is an anticlastic, i.e. saddle-shaped, warped surface with negative Gaussian distortion and is not capable of being spread out into a plane. In the ideal case, it is a minimum surface, that is the mathematically smallest possible surface enclosed by the given edge. For reasons which need not be discussed here, the preferred shaped bodies of the invention approximate the mathematically minimum surface, but do not exactly agree therewith.

By special measures, shaped bodies can be formed which deviate more strongly from the exact minimum surface, which can be desired because of structural as well as design considerations. Such shaped bodies are produced, for example, by reinforcement of the edge zones or in the saddle region.

As in the description of the method of making the new shaped bodies further explained below, the form of the shaped bodies of the invention which approximates the minimum surface arises from the flat initial surface when a biaxially stretched sheet of synthetic resin is permitted partially to shrink while in the thermoelastic state, with its edge fixed. Because of the shrinking forces latent in the biaxially stretched initial sheet, the sheet attempts to shrink back to its original smaller surface area when heated to the thermoelastic state. This shrinking process is limited by the fixed edge. As a result, the sheet shrinks to acquire the smallest possible surface within the given edge, whereby under the most favorable circumstances, a minimum surface is almost reached. Prerequisite for the formation of a shape approximating the minimum surface in an only partial shrinkage from the originally biaxially stretched state. Thus, the shaped body being formed must continue to be biaxially stretched at every point, although to a lesser extent than the originally biaxially stretched sheet which is used. Preferably, the amount of residual stretching is at least still 25%. The more uniform the distribution of the residual stretching at every point and in every direction of the shaped body, the closer its shape to the mathematically minimum surface.

In a dome or barrel vault surface, the approximated minimum surface has the advantage of better resistance to buckling. The surface is oppositely (anticlastically) curved at practically every point in two mutually perpendicular directions. In this way, upon the application of a punctiform load, a pressure strain arises in one of these directions and a tensile strain in the other. As a result, buckling will be prevented as long as the tensile strength of the material is not exceeded.

The shaped bodies of the invention are, to be sure, essentially rigid and torsion-resistant, and retain their shape even in the uninstalled state. However, they are less rigid as domes and can therefore yield elastically with limited movements of the edge. They are of a single piece in the sense that they are not assembled from various separately made and detachable parts but consist of continuous, seamless material, which of course does not exclude laminated reinforcing elements possibly made of other materials. In arranging the shaped bodies to form transparent strips or extended roof surfaces, the edges in any event are the construction elements which most project outwardly. In general, the edges are held by stable metal frames capable of supporting maintenance scaffolding and the like. In this way, shaped bodies with base surface can be simply made, which bodies can be combined to form large surfaces without a break. This suggests the possibility of developing the shaped bodies, with a suitable mounting, as a modular structural system element and of using them additively for making supported structures of wide area.

Those stretched synthetic resins which have proved their worth in the manufacture of structural elements are suitable materials for the shaped bodies of the invention. The best of these is acrylic glass, because of its unexcelled resistance to aging and weathering. Polyvinylchloride and polycarbonate are also suitable, especially when they carry a thin layer of acrylic resin for protection of the surface. To ensure the required torsion resistance, the thickness of the resin should be at least 1 mm. The preferred thickness is somewhere between 2 mm and 6 mm. The area of a shaped body may be between 1 m$^2$ and 10 m$^2$. Clear transparent or white translucent materials are preferred, but opaque or transparent colored materials may be used. The original material used for making the shaped bodies is stretched biaxially at least 25%, preferably 40 to 80%, and can be made from sheet material (which is extruded or polymerized in situ) by stretching while in the thermoelastic state.

Among the advantages of the new shaped bodies is also the possibility of manufacturing them in relatively simple fashion without touching the surface thereof. The procedure is always to bring the edge of the sheet into a configuration which does not lie in one plane, fix it, and to permit the surface enclosed by the edge to shrink partially while in the thermoelastic state. The shape of the invention then is automatically formed under the effect of the liberated restoring forces without the action of a high or low gas pressure on one side of the plate. Since a completely contact-free forming of the sheet surface (apart from the restraint at the edge) is possible, damage to the sheet surfaces is practically excluded. The most expedient method of manufacture is particularly directed by the desired shape of the shaped body and will be explained in detail below with the aid of the preferred embodiments.

DESCRIPTION OF THE DRAWINGS

The preferred embodiments are shown in FIGS. 1 to 4, in which the imaginary flat initial surface is designated as a and the shape of the finished body, approximating the minimum surface, is designated b. To clarify the shape of the surface, a network of dotted lines with no particular technical significance is drawn into the imagined flat initial surface as well as the surface of the shaped body.

The base surfaces of further shaped bodies according to the invention are shown in FIGS. 5 and 6. The heavily drawn lines are the outlines of the base surfaces, the dot-and-dashed lines are the outlines of the original planar synthetic resin sheets used, and the dotted lines are the fold lines for making the flat initial surfaces.

Figure 1A:
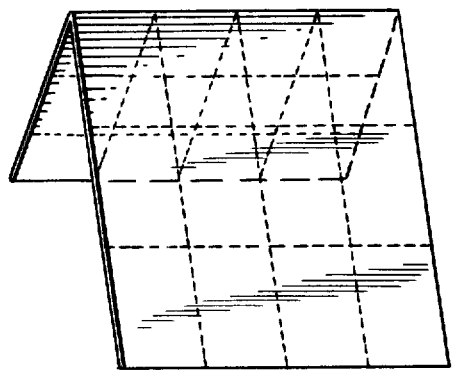
FIG. 1 shows the initial surface in the form of a saddle roof.
Figure 1B:
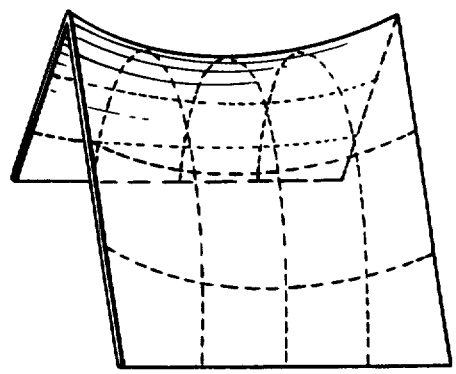
Figure 2A:
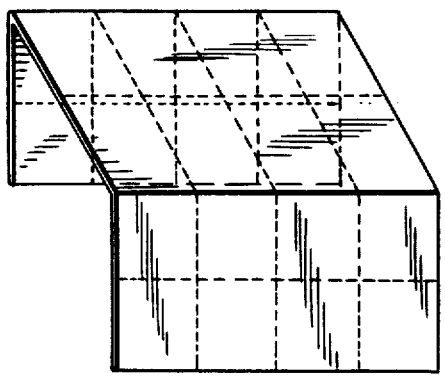
FIG. 2 shows a rectangular box.
Figure 2B:
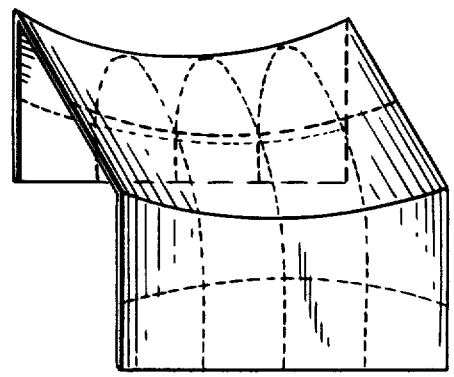

For making the shaped bodies of FIGS. 1, 2, and 4, in which the initial surface has sharp-edged fold lines, a tension frame surrounding the edge and having flap hinges at the end points of the fold lines is preferably used. The planar biaxially stretched synthetic resin sheet is clamped into the frame while cold such that the edge of the sheet is not pulled out of tension by the liberated shrinking or restoring forces when heated to the thermoelastic state. The frame is then heated, for example in a hot-air cabinet, until the synthetic resin sheet softens. In the case of acrylic glass, the thermoelastic state range extends from about 130° C. to 160° C. After that, the tension frame is bent around the hinges until the edge assumes the desired shape. The enclosed surface shrinks together to a shape approximating the minimum surface in the manner described above. The body is allowed to cool in this shape and can assume it as a form-stable structure after the tension frame is loosened.

Figure 3A:
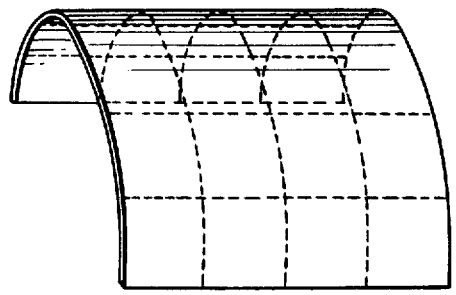
FIG. 3 shows a cylindrical section.
Figure 3B:
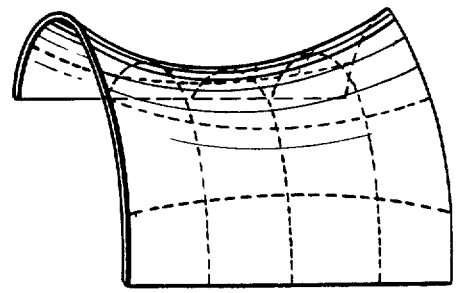

For the manufacture of bodies with curved edges in accordance with FIG. 3, a correspondingly curved tension frame is used in which the first planar sheet is inserted by bending it elastically. The sheet then assumes the position shown in FIG. 3a and is fixed in this position. As soon as the thermoelastic state is reached on heating, the shrinking begins and leads to the shape shown in FIG. 3b.

In similar fashion the shaped bodies shown in FIGS. 1, 2, and 4 can also be made if a correspondingly bent tension frame without hinges is used. The original planar sheet is heated in a small zone on the fold line before clamping, and is bent into the desired shape when softened. The adjoining, unwarmed surfaces prevent the contraction of the warmed strips. The sheet is subsequently fixed, warmed to the thermoelastic state, and finally cooled.

Figure 4A:
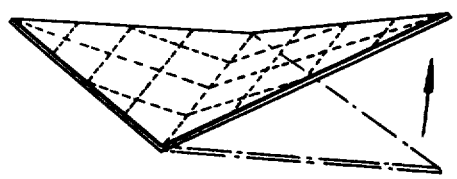
FIG. 4 shows a diagonally folded square.
Figure 4B:
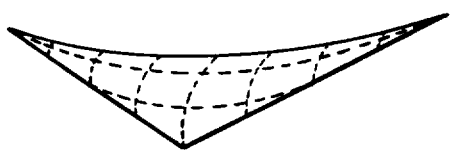
Figure 4C:
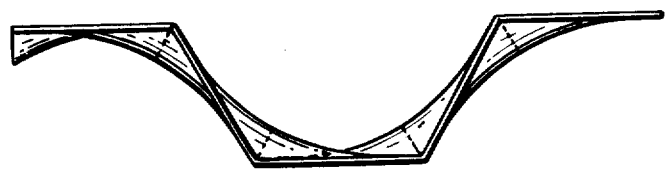
Figure 4D:
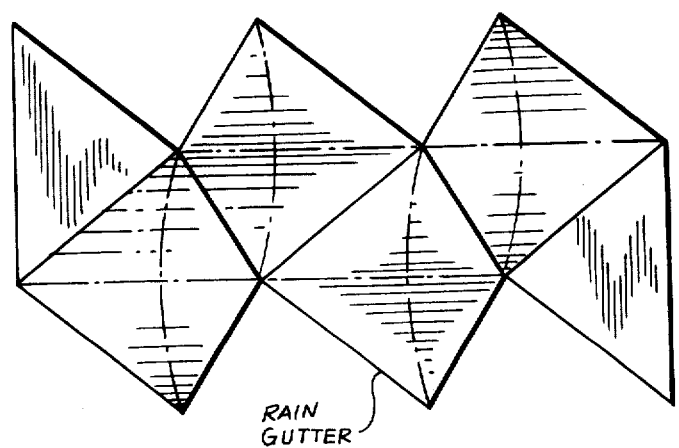

The shaped bodies shown in FIGS. 1 to 3 cover rectangular surface areas and are therefore particularly suitable for setting in a linear or wide-area array. The shaped body shown in FIG. 4 also can be joined together with others to form a trapezoidally corrugated roof surface as shown in FIGS. 4c and 4d.

Figure 5C:
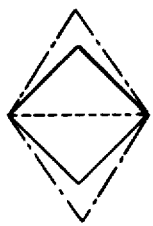
FIGS. 5a and 6b show possibilities for surface coverings arrays.
Figure 6B:
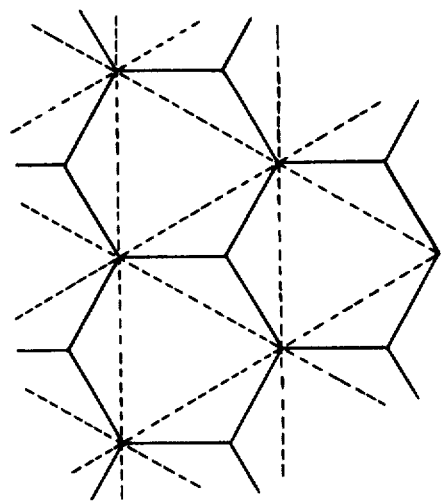
Figure 5B:
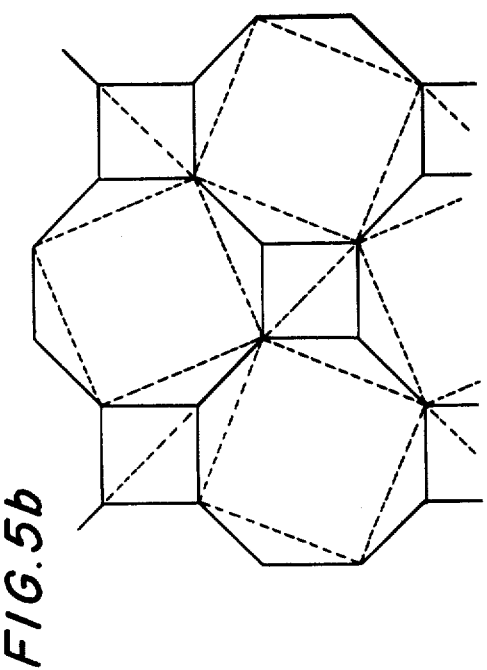
Figure 5A:
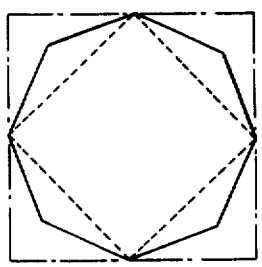
Figure 6A:
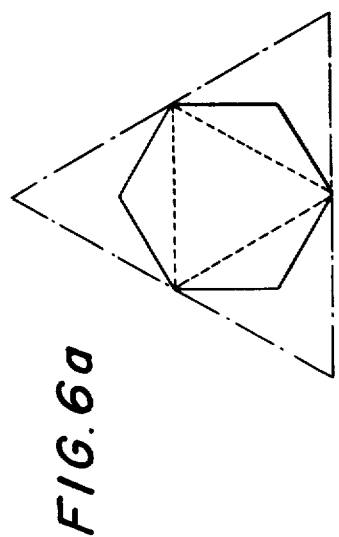

Shaped bodies having the base surface of a regular hexagon or octagon can be made for special architectural or esthetic effects if the original sheet is in the form of an equilateral triangle or square and fold lines are made through the center point of adjacent sides. The resulting hexagonal bodies alone can be closed into a surface, whereas additional bodies having square bases are required for an array of octagonal bodies, as shown in FIGS. 5 and 6. The possibility of combining a number of individual minimum surface elements constructively to create a complete surface which itself forms a minimum surface should not remain unmentioned.

We claim:

1. A method for making a rigid one-piece shaped body of biaxially stretched synthetic resin in the form of a sheet having a thickness of at least 1 millimeter, said body having an edge which does not lie in one plane and having a surface smaller than the imagined flat initial surface enclosed by said edge, which method comprises deforming a sheet of biaxially stretched synthetic resin at least 1 millimeter thick by elastic bending at a temperature below the softening point of the resin into a configuration in which the edge of the sheet does not lie in a single plane, rigidly fixing the edge of the sheet, and heating said sheet without touching the surface thereof and with equal gas pressure on both sides of the sheet until said synthetic resin is in the thermoelastic state, whereby the surface of the sheet enclosed by the edge shrinks back partially but shrinkage of the edge of the sheet is not permitted, and subsequently cooling the sheet below the softening temperature of the synthetic resin.

2. A method as in claim 1 wherein the edge of said shaped body has two pairwise opposed rectilinear edge segments and two pairwise opposed arcuate edge segments.

3. A rigid one-piece shaped body made by the method of claim 1.

4. A method for making a rigid one-piece shaped body of biaxially stretched synthetic resin in the form of a sheet having a thickness of at least 1 millimeter, said body having an edge which does not lie in one plane and having a surface smaller than the imagined flat initial surface enclosed by said edge, which method comprises rigidly fixing the edge of a sheet of biaxially stretched synthetic resin at least 1 millimeter thick, heating said sheet without touching the surface thereof and with equal gas pressure on both sides of the sheet until said synthetic resin is in the thermoelastic state, and deforming said heated sheet into a configuration in which the edge of the sheet does not lie in a single plane, whereby the surface of the sheet enclosed by the edge shrinks back partially but shrinkage of the edge of the sheet is not permitted, and subsequently cooling the sheet below the softening point of the synthetic resin.

5. A method as in claim 4 wherein the edge of said shaped body consists of a plurality of rectinlinear segments.

6. A rigid one-piece shaped body made by the method of claim 4.

7. A method for making a rigid one-piece shaped body of biaxially stretched synthetic resin in the form of a sheet having a thickness of at least 1 millimeter, said body having an edge which does not lie in one plane and having a surface smaller than the imagined flat initial surface enclosed by said edge, which method comprises first folding a sheet of said biaxially stretched resin along at least one fold line by heating said resin above its softening point in a small zone along said fold line and deforming the sheet so that the edge of said sheet is no longer in a single plane, then rigidly fixing the edge of the deformed sheet and heating said sheet without touching the surface thereof and with equal gas pressure on both sides of said sheet until said synthetic resin is in the thermoelastic state, whereby the surface of the sheet enclosed by the edge shrinks back partially but shrinkage of the edge of the sheet is not permitted, and subsequently cooling the sheet below the softening temperature of the synthetic resin.

8. A rigid one-piece shaped body made by the method of claim 7.

* * * * *